(No Model.)
G. GORDON.
REVERSIBLE MUD GUARD AND STORM FENDER.
No. 606,135. Patented June 21, 1898.
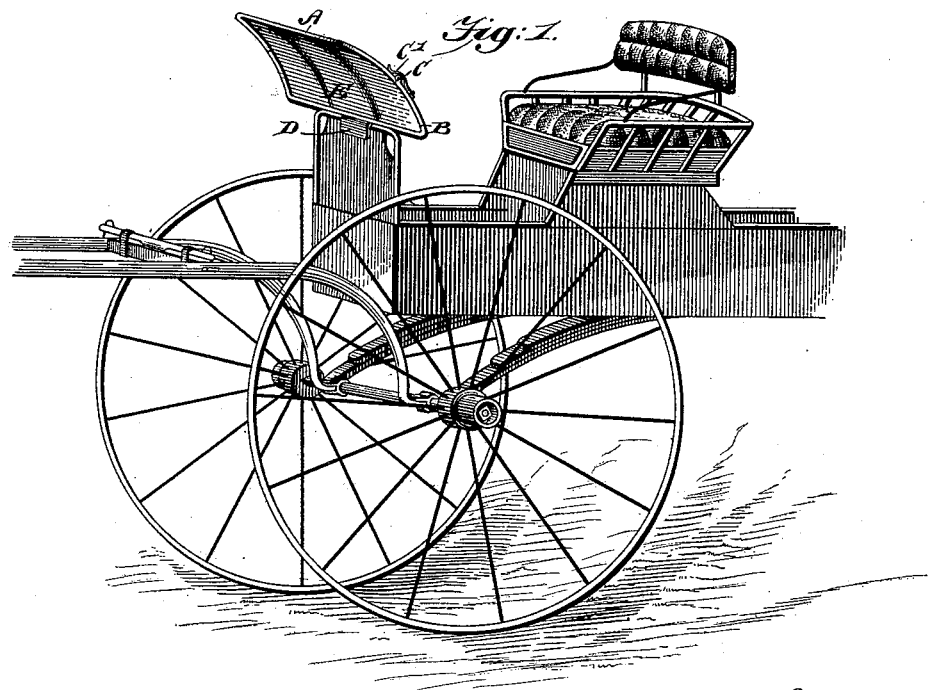
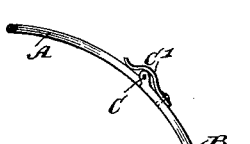
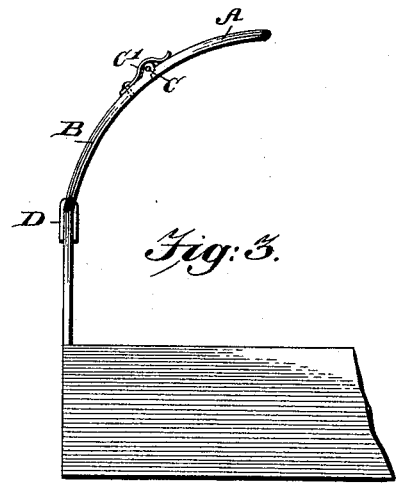
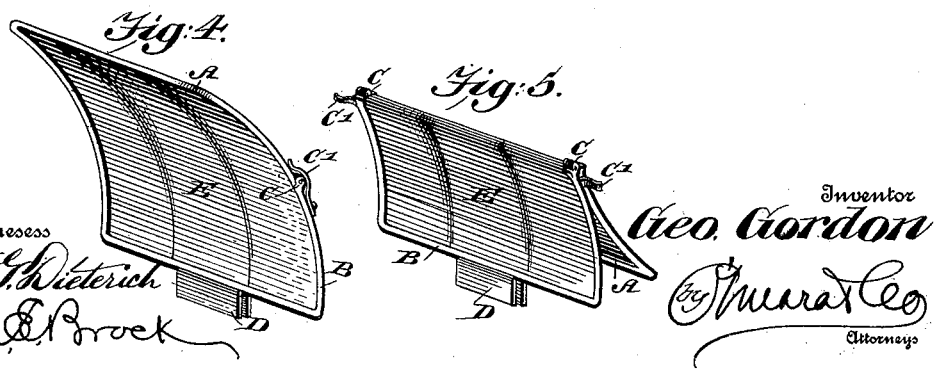
Witnesses
H. S. Dieterich
Chas. E. Brock
Inventor
Geo. Gordon
By Murat Leo
Attorneys

UNITED STATES PATENT OFFICE.

GEORGE GORDON, OF LERNA, ILLINOIS.

REVERSIBLE MUD-GUARD AND STORM-FENDER.

SPECIFICATION forming part of Letters Patent No. 606,135, dated June 21, 1898.

Application filed September 1, 1897. Serial No. 650,299. (No model.)

*To all whom it may concern:*

Be it known that I, GEORGE GORDON, residing at Lerna, in the county of Coles and State of Illinois, have invented a new and useful Reversible Mud-Guard and Storm-Fender, of which the following is a specification.

This invention relates to improvements in vehicle appliances, and has for its object to provide a device adapted for attachment to the dashboards of buggies, wagons, or other vehicles by means of which the occupants of the vehicle are more effectively protected against the mud and water thrown backwardly by the horse.

A further object is to provide by the reversal of my device an effective storm-fender which will serve in lieu of a robe or cloth for shielding the occupants of the vehicle against wind, snow, or rain.

My improved mud-guard and fender is exceedingly simple in construction, and its adaptation to either purpose named may be effected with the greatest expedition, and when not in use it may be folded and carried under the seat of the buggy or elsewhere in very small compass.

In the drawings herewith, forming a part of this specification, in which like parts are indicated by similar letters of reference, Figure 1 is a perspective view showing my device applied to the dashboard of a buggy. Fig. 2 is an edge view showing the device in operation as a mud-guard. Fig. 3 is a similar view showing its attachment as a storm-fender. Fig. 4 is a perspective view of the device detached. Fig. 5 is a similar view showing it both detached and folded.

In the construction of my improved fender or mud-guard I provide a rectangular frame, consisting of portions A and B, hinged together laterally by means of stop-hinges C. Each of the portions A and B is curved so as to form when unfolded a continuous arc, as shown.

Secured to the horizontal portion B, I provide a spring-clamp D, consisting of double-walled portions, forming a slot into which the upper edge of the dashboard may be inserted and the device retained thereon.

As relatively shown in Figs. 1, 2, and 4, the device is a mud-guard, the convex surface being toward the occupants and the outer edge of the portion A projected forwardly of the buggy or wagon body. In order that the device may be retained in such position when unfolded, I provide at each end of the frame, secured by a pivot upon the portion B, a spring C', having its free end resting upon the portion A, as shown. When the device is folded, as shown in Fig. 5, the free end of the spring C' is drawn outwardly, so as to permit such folding.

When it is desired to use the device as a storm-fender, the convex surface is turned forwardly, as shown in Fig. 3, by which means the occupants of the vehicle will be fully protected from the driving rain, snow, or from the wind.

The frame, consisting of the folding portions A and B, may be covered by any suitable material E, either oil-cloth, japanned leather, or any other suitable impervious and flexible material.

When not in use, the device is removed from the vehicle and folded, as shown in Fig. 5, after which it may be deposited beneath the seat of the buggy, so as to be entirely out of the way.

By means of the construction as above set forth I provide a very useful and convenient device for the purpose stated and one which may be manufactured and marketed either as a portion of the vehicle or separately therefrom at very moderate cost.

Having thus fully described my invention, what I claim as new, and desire to secure by means of Letters Patent, is—

1. The combination with the dashboard of a vehicle, of a reversible mud-guard and storm-fender, consisting of a rectangular frame comprising two portions hinged to each other and curved as shown, and means for retaining them in an unfolded position and in attachment to the dashboard of the vehicle, all substantially as herein shown and set forth.

2. The combination with the dashboard of a vehicle, of a detachable and reversible mud-guard and storm-fender, consisting of a frame portion comprising two parts hinged to each other laterally, and a flexible portion covering said frame, substantially as herein shown and set forth.

3. The combination with the dashboard of a vehicle, of a reversible and detachable folding mud-guard and storm-protector, consisting of a metal frame divided and hinged laterally, means for retaining said portions in an unfolded position, and means for securing the lower of said hinged portions upon the dashboard of the vehicle, all substantially as herein shown and set forth.

4. The combination with the dashboard of a vehicle, of a mud-guard and storm-protector, consisting of two curved frame portions laterally hinged to each other and provided with a continuous cover of impervious flexible material, means whereby the said portions of the frame may be maintained in a folded position, and means in connection with the lower portion of said frame whereby the device may be secured to the dashboard either as a mud-guard or as a storm-fender, all substantially as herein shown and set forth.

GEORGE GORDON.

Witnesses:
  J. W. LEITCH,
  D. E. BURT.